(12) United States Patent
Kim et al.

(10) Patent No.: US 11,031,650 B2
(45) Date of Patent: Jun. 8, 2021

(54) BATTERY MODULE AND BATTERY PACK COMPRISING SAME

(71) Applicant: LG Chem, Ltd., Seoul (KR)

(72) Inventors: Kyung-Mo Kim, Daejeon (KR);
Jeong-O Mun, Daejeon (KR);
Jin-Yong Park, Daejeon (KR);
Jung-Hoon Lee, Daejeon (KR);
Ho-June Chi, Daejeon (KR)

(73) Assignee: LG Chem, Ltd.

( * ) Notice: Subject to any disclaimer, the term of this patent is extended or adjusted under 35 U.S.C. 154(b) by 21 days.

(21) Appl. No.: 16/485,288

(22) PCT Filed: Jul. 24, 2018

(86) PCT No.: PCT/KR2018/008368
§ 371 (c)(1),
(2) Date: Aug. 12, 2019

(87) PCT Pub. No.: WO2019/066229
PCT Pub. Date: Apr. 4, 2019

(65) Prior Publication Data
US 2019/0379016 A1    Dec. 12, 2019

(30) Foreign Application Priority Data
Sep. 29, 2017 (KR) .................. 10-2017-0127475

(51) Int. Cl.
*H01M 2/10* (2006.01)
*H01M 2/20* (2006.01)
(Continued)

(52) U.S. Cl.
CPC ......... *H01M 50/20* (2021.01); *H01M 50/502* (2021.01); *H01M 50/531* (2021.01);
(Continued)

(58) Field of Classification Search
None
See application file for complete search history.

(56) References Cited

U.S. PATENT DOCUMENTS 6,391,489 B1 * 5/2002 Winch ................ H01R 11/288
429/1
2004/0028999 A1    2/2004 Richard et al.
(Continued)

FOREIGN PATENT DOCUMENTS

JP    H11025951 A    1/1999
JP    2005209735 A    8/2005
(Continued)

OTHER PUBLICATIONS

Extended European Search Report with Written Opinion for Application No. 18863470.3 dated Apr. 3, 2020, 7 pages.
(Continued)

*Primary Examiner* — Amanda J Barrow
(74) *Attorney, Agent, or Firm* — Lerner, David, Littenberg, Krumholz & Mentlik, LLP (57) ABSTRACT

A battery module includes: a battery cell stack in which a plurality of battery cells are stacked; and a bus bar to which electrode leads provided at the respective plurality of battery cells are coupled, wherein the bus bar presses the electrode leads so that the bus bar and the electrode leads are electrically connected.

10 Claims, 6 Drawing Sheets

(51) Int. Cl.
*H01M 2/26* (2006.01)
*H01M 50/20* (2021.01)
*H01M 50/502* (2021.01)
*H01M 50/531* (2021.01)
*B23K 101/36* (2006.01)
*B23K 20/10* (2006.01)

(52) U.S. Cl.
CPC .......... *B23K 20/10* (2013.01); *B23K 2101/36* (2018.08); *H01M 2220/20* (2013.01)

(56) References Cited

U.S. PATENT DOCUMENTS

| | | | |
|---|---|---|---|
| 2010/0266889 A1* | 10/2010 | Kim | H01M 2/202 429/158 |
| 2011/0177381 A1 | 7/2011 | Oya et al. | |
| 2011/0229754 A1 | 9/2011 | Zhao et al. | |
| 2012/0100420 A1* | 4/2012 | Byun | H01M 2/30 429/179 |
| 2014/0248517 A1 | 9/2014 | Yoshioka | |
| 2014/0308568 A1* | 10/2014 | Kim | H01M 2/0473 429/158 |
| 2015/0140393 A1* | 5/2015 | Yamamoto | H01R 11/288 429/121 |
| 2015/0171399 A1 | 6/2015 | Jeong | |
| 2015/0171401 A1* | 6/2015 | Kim | H01M 2/204 429/158 |
| 2015/0180006 A1* | 6/2015 | Maguire | H01M 2/202 429/121 |
| 2015/0263326 A1* | 9/2015 | Gunther | B23K 31/02 429/121 |
| 2015/0380711 A1* | 12/2015 | Oechsle | H01M 2/206 429/121 |
| 2016/0072117 A1* | 3/2016 | Sim | H01M 2/30 429/158 |
| 2016/0261124 A1* | 9/2016 | Kang | G01R 31/396 |
| 2017/0125772 A1* | 5/2017 | Leung | H01M 2/30 |
| 2017/0179458 A1* | 6/2017 | Sato | H01M 2/206 |

FOREIGN PATENT DOCUMENTS

| | | |
|---|---|---|
| JP | 2005528741 A | 9/2005 |
| JP | 2007087907 A | 4/2007 |
| JP | 2007109548 A | 4/2007 |
| JP | 2013105700 A | 5/2013 |
| KR | 20130029982 A | 3/2013 |
| KR | 20150071117 A | 6/2015 |
| KR | 20150137840 A | 12/2015 |
| KR | 20160064858 A | 6/2016 |
| KR | 20160087163 A | 7/2016 |
| KR | 20160115532 A | 10/2016 |
| KR | 20170087084 A | 7/2017 |
| WO | 2010052788 A1 | 5/2010 |

OTHER PUBLICATIONS

International Search Report for Application No. PCT/KR2018/008368, dated Nov. 23, 2018, pp. 1-2.

* cited by examiner

FIG. 1

PRIOR ART

BATTERY MODULE AND BATTERY PACK COMPRISING SAME

CROSS-REFERENCE TO RELATED APPLICATIONS

The present application is a national phase entry under 35 U.S.C. § 371 of International Application No. PCT/KR2018/008368, filed Jul. 24, 2018, which claims priority to Korean Patent Application No. 10-2017-0127475 filed on Sep. 29, 2017, the disclosures of which are incorporated herein by reference.

TECHNICAL FIELD

The present disclosure relates to a battery module and a battery pack including the battery module, and more particularly, to a battery module and a battery pack including the battery module, which allows electrode leads to be coupled to a bus bar without being bent.

BACKGROUND ART

As technology development and demand for a mobile devices have increased, demand for a secondary battery as an energy source has rapidly increased. Conventionally, a nickel-cadmium battery or a hydrogen ion battery has been used as the secondary battery. However, a lithium secondary battery has recently been widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

Figure 1:
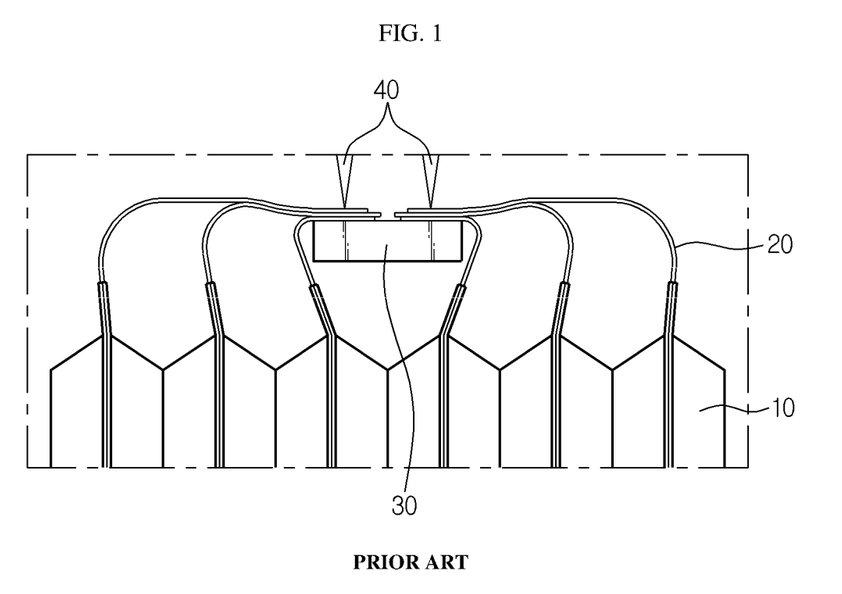
FIG. 1 is a diagram showing how an electrode lead and a bus bar provided at a conventional battery cell are electrically coupled.

FIG. 1 is a diagram showing that an electrode lead and a bus bar provided at a conventional battery cell are electrically coupled. Referring to FIG. 1, in the conventional technique, electrode leads 20 respectively provided at a plurality of battery cells 10 are bent to contact a surface of a bus bar 30 and then are coupled thereto by welding 40. In this case, a substantial amount of manual work is needed to maintain the bending shape of the electrode leads 20. Also, the electrode leads 20 and the bus bar 30 are not closely attached due to the elastic restoration force of the electrode leads 20 made of metal. In addition, since the plurality of electrode leads 20 are overlapped at one point of the bus bar 30 and then coupled by the welding 40, heat is concentrated on the uppermost electrode lead 20, thereby deteriorating the welding performance.

DISCLOSURE

Technical Problem

The present disclosure is designed to providing a battery module and a battery pack including the battery module, which allows electrode leads to be closely attached to a bus bar since the electrode leads are coupled to the bus bar without being bent.

Also, the present disclosure is designed to providing a battery module and a battery pack including the battery module, which may improve the welding performance since the heat generated during welding is uniformly distributed to all electrode leads.

In addition, the present disclosure is designed to providing a battery module and a battery pack including the battery module, which may improve the automation ratio of a production line since the manual work of bending the electrode leads is eliminated.

Technical Solution

In one aspect of the present disclosure, there is provided a battery module, comprising: a battery cell stack in which a plurality of battery cells are stacked; and a bus bar to which electrode leads respectively provided at the plurality of battery cells are coupled, wherein the bus bar presses the electrode leads so that the bus bar and the electrode leads are electrically connected.

Also, the bus bar may include: a base member electrically connected to the electrode leads; and a rotating member rotatably coupled to the base member to press the electrode leads interposed between the rotating member and the base member.

In addition, the rotating member may be provided in a pair, and the pair of rotating members may be respectively coupled to both side ends of the base member.

Also, the base member may include: a pair of horizontal members formed in a horizontal direction; and a vertical member formed in a vertical direction to connect the pair of horizontal members.

In addition, a length of the horizontal member in the horizontal direction may be longer than a length of the vertical member in the horizontal direction to form a space between ends of the pair of horizontal members, and the pair of rotating members may be rotatably disposed in the space.

Also, an electrode lead group in which the plurality of electrode leads are coupled to each other may be interposed between the base member and the rotating member.

In addition, the plurality of electrode leads may be coupled by ultrasonic welding to form the electrode lead group.

Also, the base member and the rotating member between which the electrode leads are interposed may be coupled by welding.

Meanwhile, in another aspect of the present disclosure, there is also provided a battery pack including the battery module described above, and there is also provided a vehicle including the battery module.

Advantageous Effects

According to the embodiments of the present disclosure, since the rotating member presses the electrode leads to electrically connect the electrode leads to the base member, the electrode leads are coupled to the bus bar without being bent, thereby allowing the electrode leads to be closely attached to the bus bar.

Also, since the base member and the rotating member between which the electrode leads are interposed are welded, the heat generated during welding is uniformly distributed to all electrode leads, thereby improving the welding performance.

In addition, since the manual work of bending the electrode leads is eliminated, it is possible to improve the automation ratio of a production line.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
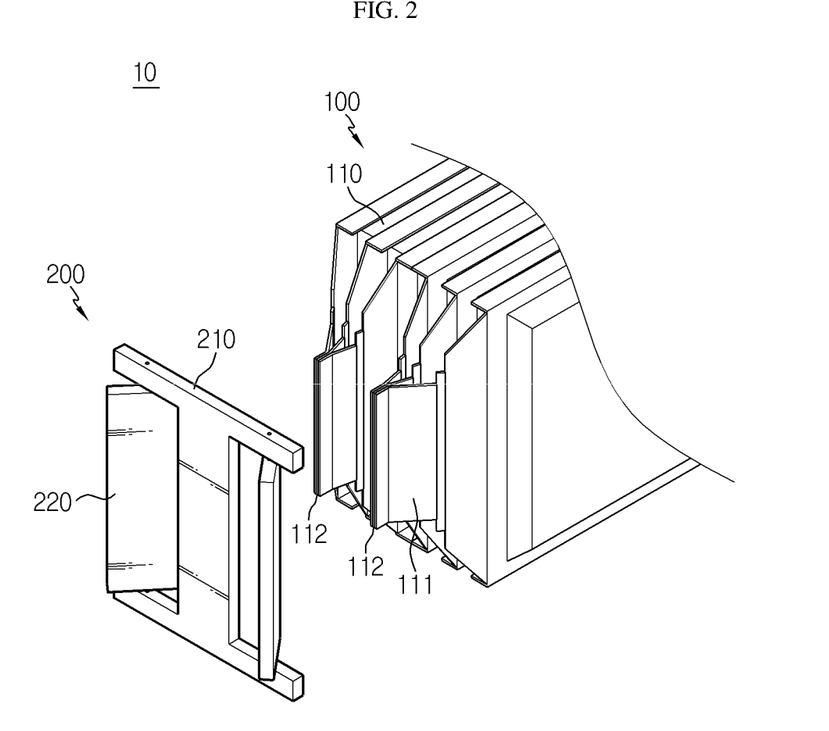
FIG. 2 is an exploded perspective view showing electrode leads and a bus bar in a state where a rotating member is rotated so as not to press the electrode leads, in a battery module according to an embodiment of the present disclosure.
Figure 3:
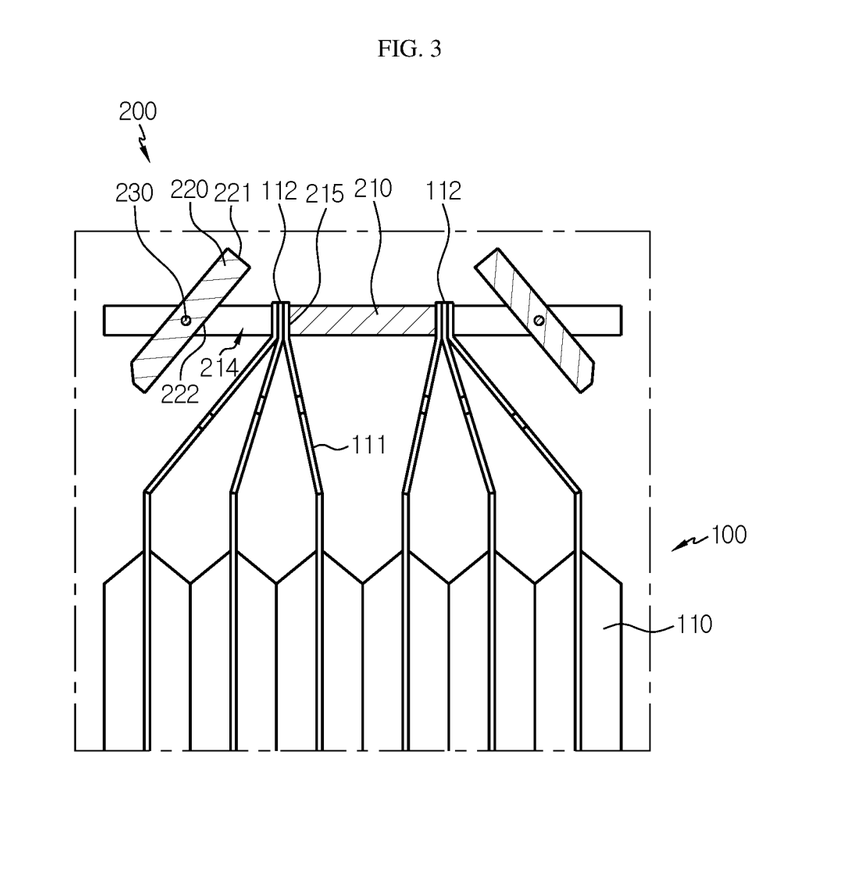
FIG. 3 is a side sectional view showing the electrode leads and the bus bar in a state where the rotating member is rotated so as not to press the electrode leads, in the battery module according to an embodiment of the present disclosure.
Figure 4:
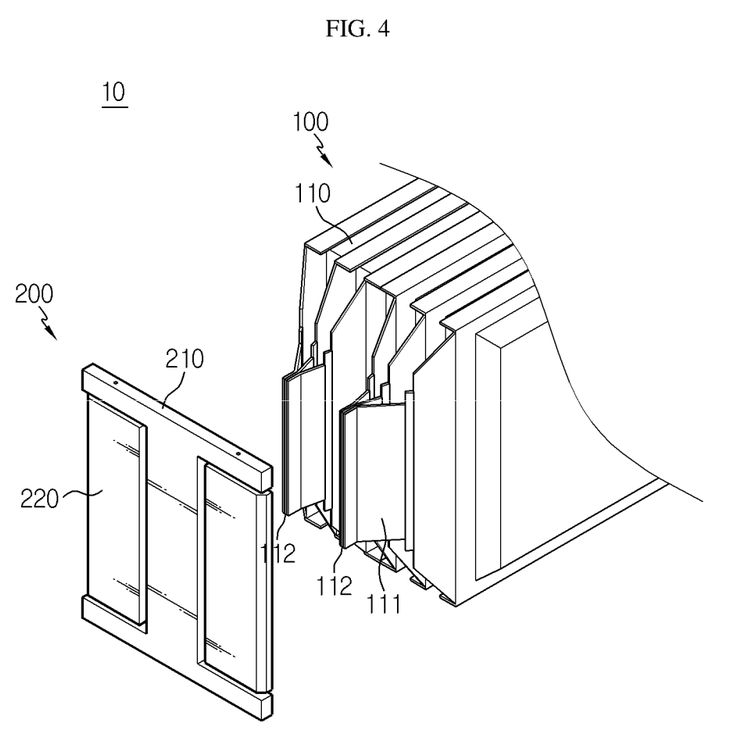
FIG. 4 is an exploded perspective view showing the electrode leads and the bus bar in a state where the rotating member is rotated so as to press the electrode leads, in the battery module according to an embodiment of the present disclosure.
Figure 5:
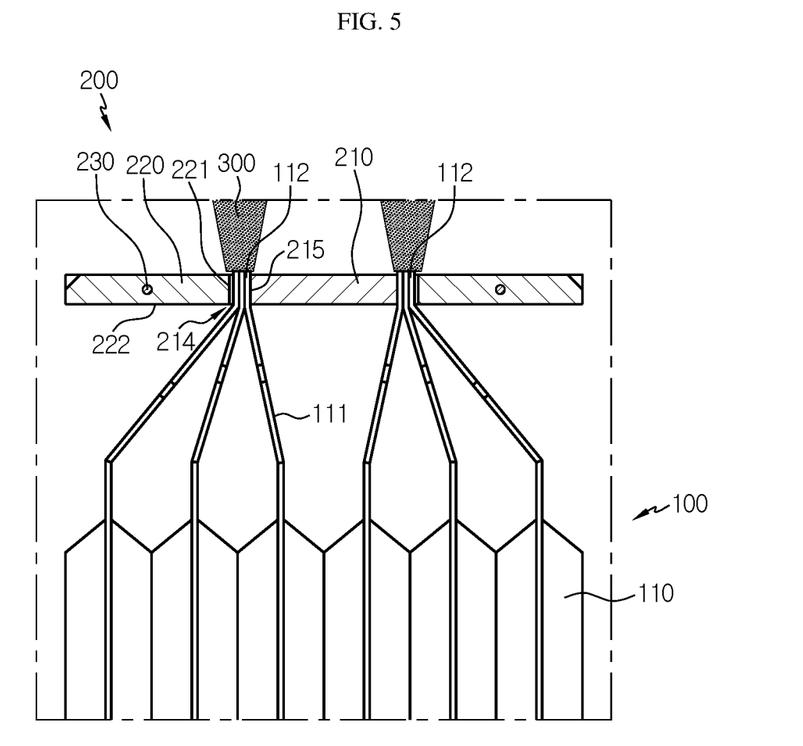
FIG. 5 is a side sectional view showing the electrode leads and the bus bar in a state where the rotating member is rotated so as to press the electrode leads, in the battery module according to an embodiment of the present disclosure.
Figure 6:
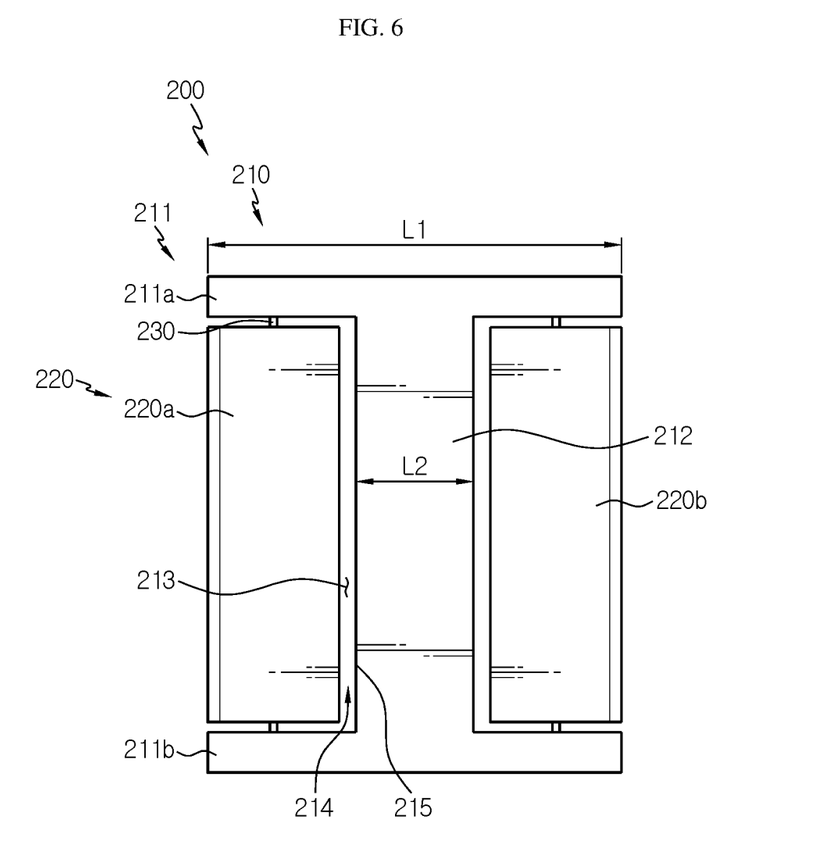
FIG. 6 is an elevation view showing the bus bar of the battery module according to an embodiment of the present disclosure.

FIG. 2 is an exploded perspective view showing electrode leads and a bus bar in a state where a rotating member is rotated so as not to press the electrode leads, in a battery module according to an embodiment of the present disclosure; FIG. 3 is a side sectional view showing the electrode leads and the bus bar in a state where the rotating member is rotated so as not to press the electrode leads, in the battery module according to an embodiment of the present disclosure; FIG. 4 is an exploded perspective view showing the electrode leads and the bus bar in a state where the rotating member is rotated so as to press the electrode leads, in the battery module according to an embodiment of the present disclosure; FIG. 5 is a side sectional view showing the electrode leads and the bus bar in a state where the rotating member is rotated so as to press the electrode leads, in the battery module according to an embodiment of the present disclosure; and FIG. 6 is an elevation view showing the bus bar of the battery module according to an embodiment of the present disclosure.

Referring to FIGS. 2 to 6, a battery module 10 according to an embodiment of the present disclosure includes a battery cell stack 100 and a bus bar 200.

The battery cell stack 100 may include a plurality of battery cells 110 stacked on one another (see FIGS. 2 to 5). The battery cell 110 may have various structures, and the plurality of battery cells 110 may be stacked in various ways. The battery cell 110 may be configured such that a plurality of unit cells or bi-cells are stacked appropriate for the battery capacity. The unit cells may be arranged in the following order: a positive electrode plate, a separator, and a negative electrode plate. The bi-cells may be arranged in the following order: a positive electrode plate, a separator, a negative electrode plate, a separator, a positive electrode plate, a separator, and a negative electrode plate.

The battery cell 110 may include an electrode lead 111. The electrode lead 111 is a kind of terminal exposed outward and connected to an external device and may be made of a conductive material. The electrode lead 111 may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110.

The battery cell stack 100 may include a plurality of cartridges (not shown) for accommodating the battery cells 110, respectively. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The bus bar 200 is coupled to the electrode leads 111 respectively provided at the plurality of battery cells 110. Here, the bus bar 200 presses the electrode leads 111, whereby the bus bar 200 and the electrode leads 111 may be electrically connected. The electrical connection may include serial or parallel connections.

The bus bar 200 may include a base member 210 and a rotating member 220. Hereinafter, the base member 210 and the rotating member 220 will be described.

The base member 210 is electrically connected to the electrode leads 111 (see FIGS. 3 and 5), and the rotating member 220, explained later, may be coupled to the base member 210. The base member 210 may be made of various materials and shapes. The base member 210 may be made of a conductive material so as to be electrically connected to the electrode leads 111. Referring to FIG. 6, the base member 210 may include a pair of horizontal members 211a, 211b formed in, for example, a horizontal direction and disposed at an upper side and a lower side to be spaced apart from each other. In addition, the base member 210 may include a vertical member 212 formed in a vertical direction, for example. Here, the vertical member 212 may be provided to connect center portions of the pair of horizontal members 211a, 211b spaced apart from each other. In addition, as shown in FIG. 6, the base member 210 may be formed such that a length L1 of the horizontal member 211 in the horizontal direction is longer than a length L2 of the vertical member 212 in the horizontal direction. For example, the base member 210 may have an approximately 'I' shape as a whole. In addition, if the base member 210 has this shape, a space 213 may be respectively formed between both side ends of the pair of horizontal members 211a, 211b spaced apart from each other. Moreover, a pair of rotating members 220a, 220b, explained later, may be rotatably disposed in the space 213, namely the space 213 respectively formed between the ends of the pair of horizontal members 211a, 211b.

The rotating member 220 is rotatably coupled to the base member 210 (see FIGS. 2 and 4) and presses the electrode leads 111 interposed between the rotating member 220 and the base member 210. The rotating member 220 may be provided in a pair, and the pair of rotating members 220a, 220b may be coupled in the space 213, respectively formed between both side ends of the base member 210, namely between both side ends of the pair of horizontal members 211a, 211b of the base member 210. The rotating member 220 may be rotatably coupled to a rotary shaft 230 coupled to the pair of horizontal members 211a, 211b, respectively. Referring to FIGS. 2 and 3, the rotating member 220 is located at a position (i.e., a second rotational position) where the rotating member 220 does not press the electrode leads 111. Here, the electrode leads 111 are inserted into the space (i.e., gap 214) formed between the base member 210 and the rotating member 220. As shown in FIG. 3, the gap 214 is defined between the outer surface of the rotating member 220 and a pressing surface 215 of the base member 210. Due to the plate-like shape of the rotating member 220 as shown in FIGS. 2 and 4, a cross-section of the rotating member 220 orthogonal to the rotational axis (i.e., in the plane shown in FIGS. 3 and 5) defines a major axis and a minor axis. As a result, a first portion 221 of the outer surface of the rotating member 220 is spaced apart from the rotational axis (defined by the rotary shaft 230) along the major axis, such that the first portion 221 is located at a greater radial distance from the rotational axis than a second portion 222 of the outer surface. In the second rotational position shown in FIG. 3, the second portion 222 of the outer surface is positioned between the pressing surface 215 and the rotational axis of the rotary shaft 230. In addition, referring to FIGS. 4 and 5, the rotating member 220 is rotated into a position (i.e., a first rotational position) in which it presses the electrode leads 111. Here, the electrode leads 111 come into contact with the base member 210 by the pressing of the rotating member 220 and maintain the electrical connection state. Specifically, in the first rotational position shown in FIG. 5, the first portion 221 of the outer surface of the rotating member 220 is positioned between the pressing surface 215 and the rotational axis of the rotary shaft 230, such that the gap 214 between the pressing surface 215 and the outer surface of the rotating member 220 is smaller in the first rotational position than in the second rotational position, thus pressing the electrode leads 111 between the pressing surface 215 and the first portion 221 of the outer surface of the rotating member 220.

Meanwhile, referring to FIGS. 2 to 5, the plurality of electrode leads 111 may form an electrode lead group 112 in which the electrode leads 111 are coupled to each other, and the electrode lead group 112 may be interposed between the base member 210 and the rotating member 220. If the rotating member 220 is rotated to press the electrode leads 111 after the plurality of electrode leads 111 are interposed between the base member 210 and the rotating member 220 in a state where the electrode leads 111 are separated from each other without being coupled to each other, the electrode leads 111 may not contact each other properly, which may cause a problem in the electrical connection between the electrode leads 111 and the bus bar 200. Thus, before the plurality of electrode leads 111 are interposed between the base member 210 and the rotating member 220, the plurality of electrode leads 111 are coupled to each other to form the electrode lead group 112, and the formed lead group 112 is interposed between the base member 210 and the rotating member 220, and also the electrode lead group 112 is pressed toward the base member 210 by the rotation of the rotating member 220. To this end, the plurality of electrode leads 111 may be coupled by means of ultrasonic welding to form the electrode lead group 112. However, without being limited to ultrasonic welding, the plurality of electrode leads 111 may be coupled in various ways. In addition, if there is no problem in the electrical connection between the electrode leads 111 and the bus bar 200, the electrode lead group 112 need not be formed, and the plurality of electrode leads 111 may be interposed between the base member 210 and the rotating member 220 in a state where the electrode leads 111 are not coupled to each other.

In addition, if the electrode leads 111, for example the electrode lead group 112, are interposed between the base member 210 and the rotating member 220, the base member 210 and the rotating member 220 may be coupled by welding, for example laser welding 300 (see FIG. 5). That is, the electrode leads 111 are coupled in advance by ultrasonic welding or the like, and the electrode lead group 112 formed by coupling the electrode leads 111 by means of ultrasonic welding or the like is interposed between the base member 210 and the rotating member 220 and is coupled to the base member 210 and the rotating member 220 by means of laser welding 300 or the like. By doing so, the electrode leads 111 may be electrically connected to the bus bar 200.

Hereinafter, the operation and effect of the battery module 10 according to an embodiment of the present disclosure will be described with reference to the drawings.

Referring to FIGS. 2 to 6, the bus bar 200 includes the base member 210 and the rotating member 220 rotatably coupled to the base member 210. The rotating member 220 is rotatably coupled to the rotary shaft 230 coupled to the base member 210. If the electrode leads 111 are interposed between the base member 210 and the rotating member 220, the rotating member 220 is rotated to press the electrode leads 111 toward the base member 210. Here, the electrode leads 111 are coupled to each other in advance, for example, by ultrasonic welding or the like to form the electrode lead group 112. If the electrode lead group 112 is interposed between the base member 210 and the rotating member 220 and the rotating member 220 is rotated to press the electrode lead group 112, the electrode lead group 112 is pressed toward the base member 210 to contact the base member 210. Here, the base member 210 and the rotating member 220 are coupled by, for example, laser welding 300 to electrically couple the electrode lead group 112 and the bus bar 200.

According to this method, the electrode leads 111 may be closely attached to the bus bar 200 since the electrode leads 111 are coupled to the bus bar 200 without being bent, unlike in the conventional technique. In addition, as shown in FIG. 5, the heat generated by, for example, laser welding 300 is not concentrated on any one electrode lead 111 but rather is uniformly distributed to all the electrode leads 111, thereby improving the welding performance.

Meanwhile, a battery pack (not shown) according to an embodiment of the present disclosure, may include one or more battery modules 10 according to an embodiment of the present disclosure as described above. Also, in addition to the battery modules 10, the battery pack (not shown) may further includes a case for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery module and a battery pack including the battery module and is particularly applicable to industries associated with a secondary battery.

What is claimed is:

1. A battery module, comprising:
a battery cell stack in which a plurality of battery cells are stacked, the battery cells having respective electrode leads; and
a bus bar for coupling to the electrode leads, the bus bar including:
a base member electrically connected to the electrode leads; and
a rotating member coupled to the base member via a rotary shaft defining a rotational axis such that the rotating member is rotatable relative to the base member about the rotational axis;
wherein the rotating member has an outer surface positioned radially outwardly from the rotational axis, the outer surface having a first portion and a second portion, the first portion being located at a first radial distance from the rotational axis, and the second portion being located at a second radial distance from the rotational axis, the first radial distance being greater than the second radial distance;
wherein the rotating member is rotatable between a first rotational position and a second rotational position, the first portion being positioned between the rotational axis and a pressing surface of the base member in the first rotational position, and the second portion being positioned between the rotational axis and the pressing surface in the second rotational position;
wherein a gap for receiving the electrode leads is defined between the pressing surface of the base member and the outer surface of the rotating member, the gap being smaller when the rotating member is in the first rotational position than when the rotating member is in the second rotational position; and
wherein the bus bar is configured to couple to the electrode leads positioned in the gap by rotating the rotating member to the first rotational position to press the electrode leads between the pressing surface of the base member and the first portion of the rotating member so as to form an electrical connection between the bus bar and the electrode leads.

2. The battery module according to claim 1,
wherein a pair of the rotating members is provided, the pair of rotating members being coupled to respective opposing side ends of the base member.

3. The battery module according to claim 2,
wherein the base member includes:
a pair of horizontal members formed in a horizontal direction; and
a vertical member disposed between the horizontal members and formed in a vertical direction so as to connect the pair of horizontal members together.

4. The battery module according to claim 3,
wherein a length of each of the pair of horizontal members in the horizontal direction is longer than a length of the vertical member in the horizontal direction, such that a pair of spaces is defined between the pair of horizontal members, each of the spaces being positioned at a respective one of the side ends of the base member, with the vertical member being disposed between the spaces, and
wherein the pair of rotating members are rotatably disposed in the respective spaces.

5. The battery module according to claim 1,
wherein an electrode lead group in which the plurality of electrode leads are coupled to each other is interposed in the gap between the base member and the rotating member.

6. The battery module according to claim 5,
wherein the plurality of electrode leads are coupled by ultrasonic welding to form the electrode lead group.

7. The battery module according to claim 1,
wherein the base member and the rotating member between which the electrode leads are interposed, are coupled by welding.

8. A battery pack, comprising the battery module defined in claim 1.

9. A vehicle, comprising the battery module defined in claim 1.

10. The battery module according to claim 1, wherein the rotating member has a plate shape such that a cross-section of the rotating member orthogonal to the rotational axis defines a major axis and a minor axis, wherein the first radial distance is defined along the major axis.

* * * * *